No. 887,443. PATENTED MAY 12, 1908.
R. THAYER.
DIRIGIBLE BALLOON.
APPLICATION FILED DEC. 26, 1907.
2 SHEETS—SHEET 1.
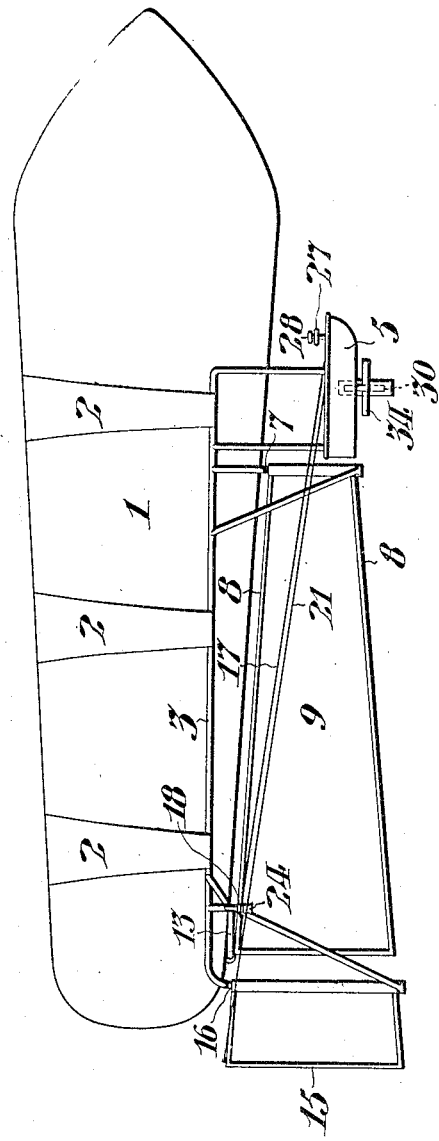
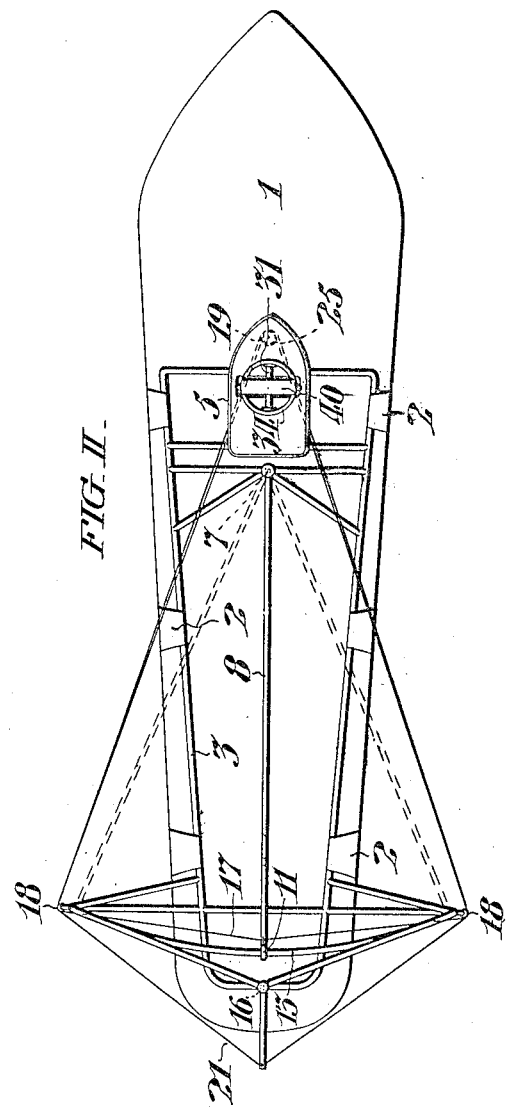
WITNESSES:
Clifton C. Hollowell
Morris L. Jensen
INVENTOR:
RUSSELL THAYER,
by Arthur E. Paige
Atty.

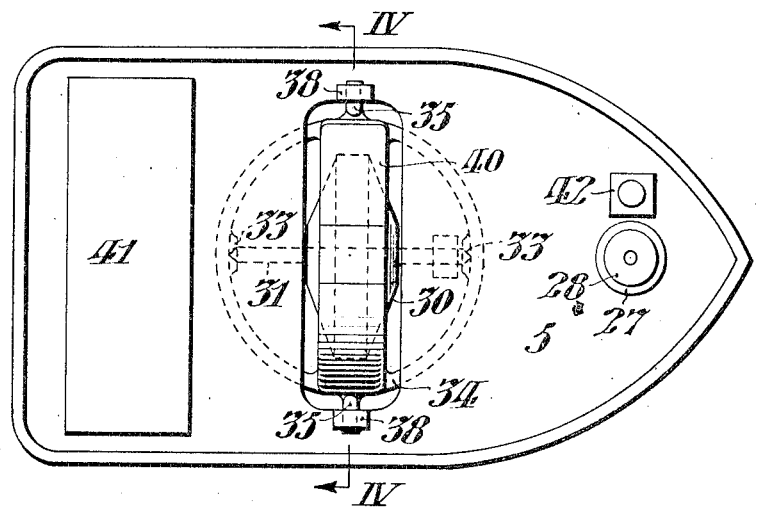
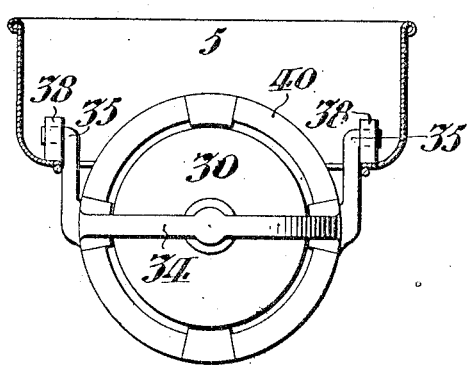

UNITED STATES PATENT OFFICE.

RUSSELL THAYER, OF PHILADELPHIA, PENNSYLVANIA.

DIRIGIBLE BALLOON.

No. 887,443.      Specification of Letters Patent.      Patented May 12, 1908.

Application filed December 26, 1907. Serial No. 408,002.

*To all whom it may concern:*

Be it known that I, RUSSELL THAYER, of Philadelphia, in the State of Pennsylvania, have invented a certain new and useful Improvement in Dirigible Balloons, whereof the following is a specification, reference being had to the accompanying drawings.

In sailing a marine vessel, the effect of the wind pressure is controllable by utilizing the reactive effect of the water upon the vessel whereas, in ordinary balloons, there is no equivalent for the reactive effect of the water, and consequently such balloons must go with the wind unless provided with more powerful propelling means.

Therefore, it is an object of my invention to provide a balloon with means whereby a reactive force may be created and controlled local to the balloon, at the will of the operator, so as to be similar in effect to the reactive force of the water upon a marine vessel, in that by properly utilizing it, the balloon may be progressed, solely by wind pressure, in directions oblique with respect to the direction of the wind.

I have discovered that by utilizing the reactive gyroscopic force manifested upon any attempt to change the direction of the axis of a rotary body, in combination with the wind pressure upon a balloon floating in the atmosphere and carrying said body, that the movement of the balloon may be variably determined and controlled by correlation of the force developed by the gyroscope and the force of the air current. In other words, my invention provides means whereby wind pressure tending to diverge a balloon from a predetermined direction of traverse may be variably opposed by the gyroscopic effect of a rotary body carried by the balloon, under control of the operator, so that such wind pressure may be utilized to propel the balloon, in directions oblique to the direction of the wind pressure, as in ordinary marine navigation.

The gyroscopic reactive effect above contemplated is due to the fact that a rotary body tends to maintain constant its plane of rotation and consequent direction of its axis of rotation, such effect being increased or diminished in correspondence with the speed of rotation of the body. However, it is important to note that to render such reactive effect available as herein contemplated it is necessary to so mount the rotary body that its axis of rotation is free to oscillate, to a limited extent, in a direction parallel with the direction of said axis, for, when a body rotating upon a principal axis is subjected to a force tending to produce another rotation not parallel to the former, the resultant effect is such displacement of the axis of the original rotation, with respect to its support, as is most favorable to the parallelism of the two rotations, and, such displacement is at right angles to the direction of the disturbing force.

In a balloon constructed in accordance with my invention as hereinafter described, the force due to the natural air drift, and the gyroscopic force created by controlled rotation of a suitable body carried by the balloon, may be so correlated, at the will of the operator, as to propel the balloon solely by the wind pressure, and in any direction except that directly and approximately opposed to such pressure.

I am of course aware that gyroscopes have been employed for many years and in various arts to balance or maintain the level or equilibrium of structures connected therewith, and therefore note that the gyroscope element of my invention has no such function or effect in the arrangement and operation which are characteristic of my invention as herein defined. I am also aware that it has been proposed to provide a marine vessel with gyroscopic wheels, but such wheels have been designedly arranged to maintain the horizontal planes of the vessel substantially stable, without opposing changes in the direction of traverse of the vessel. In other words, such devices of the prior art have been employed for a purpose radically different from that herein contemplated, and have been so constructed and arranged as to be incapable of the effects which are characteristic of my invention.

My invention comprises the various novel features of construction and arrangement hereinafter more definitely specified.

In the drawings; Figure I, is a side elevation of a balloon conveniently embodying my invention. Fig. II, is an inverted plan view of the balloon shown in Fig. I. Fig. III, is a plan view of the car shown in Fig. I. Fig. IV, is a transverse sectional view of said car, taken on the line IV, IV, in Fig. III.

In said figures; the gas envelop 1, which is of circular cross section, diminishing toward its stern, is conveniently connected by the bands 2, with the main frame 3. Said frame supports the car 5, and has the vertical shaft 7, which supports the frame 8, of the sail 9, in a vertical plane. Said sail frame 8, comprises the bearing 11, mounted to slide on the boom bar 13, so that said frame 8, is supported for transverse oscillatory movement with respect to the main frame 3. The rudder frame 15, is mounted to oscillate transversely on the vertical shaft 16, in said frame 3. Said sail frame 8, is provided with flexible connectors 17, which extend around the pulleys 18, at the outer ends of said boom 13, to the rotary drum 19, in the car 5, and, the flexible connectors 21, extend from the rudder frame 15 around the pulleys 24, to the rotary drum 25, in said car. Said drums 19, and 25, are respectively provided with the hand wheels 27, and 28, whereby, said sail and rudder may be independently adjusted to different angles with respect to the longitudinal axis of the balloon.

Although I have shown the balloon provided with a sail and rudder which are adjustable with respect to the longitudinal axis of the balloon, at the will of the operator, as above described, so as to receive wind pressure in variable angular relation, it is to be understood that the balloon may be propelled in the manner described, without the employment of such adjunctive devices and solely by the wind pressure upon the balloon itself, and in this connection it may be observed that the envelop 1, is rendered more effective for its progressive movement by having its exterior converged toward its stern.

The rotary body 30, whose mass may be in any desired proportion to the mass of the balloon, is carried by the shaft 31, which normally extends substantially horizontal and parallel with the longitudinal axis of the balloon, and consequently parallel with the normal direction of traverse of the balloon. Said shaft 31, is mounted to rotate in the bearings 33, of the gimbal frame 34, and the latter is provided with oppositely extending trunnions 35, having a common axis of oscillation extending transversely above the center of gravity of said wheel and frame. Said trunnions 35, are journaled in the bearings 38, and so constructed and arranged that the oscillatory movement of said body is limited to approximately fifteen degrees. Said bearings are supported by the car, and may be adjusted and secured in variable relation with the longitudinal axis of the balloon, by any convenient means. The rotation of said body 30, may be effected and controlled by any convenient means. However, in the form indicated, said wheel comprises the armature of an electric motor having the field frame 40, carried by the gimbal frame 34, and said motor is energized by suitable connections with the source of power 41, controlled by the switch mechanism indicated at 42. It is to be understood that said body 30, may be rotated at variable speed, to produce and control its gyroscopic effect, so that said effect may be opposed to any force tending to turn the balloon from a path coincident with its longitudinal axis, and, that consequently any wind pressure upon the balloon, so received as to tend to change the plane of rotation and direction of the axis of said body 30, may be opposed by the gyroscopic effect of said wheel, so that such wind pressure may be utilized to effect the forward movement of the balloon in a direction oblique with respect to the direction of the wind, if desired, the direction of propulsion being also variably determinable, at the will of the operator, by adjustment of the angular relation of said sail and rudder with respect to the longitudinal axis of the balloon.

I do not desire to limit myself to the precise details of construction and arrangement herein described, as various modifications may be made therein without departing from the essential features of my invention, as defined in the appended claims.

I claim:—

1. In a balloon, the combination with levitating means; of a rotary body having its axis substantially horizontal; and means supporting said axis, permitting free but limited oscillatory movement thereof in a direction parallel with said axis; whereby wind pressure tending to turn the balloon from a predetermined direction of traverse, may be opposed by the gyroscopic effect of said rotary body, so that such wind pressure may be utilized to propel the balloon in directions oblique to the direction of the wind pressure.

2. In a balloon having its longitudinal axis substantially horizontal, the combination with levitating means; of a rotary body having its axis substantially horizontal and disposed transversely with respect to the longitudinal axis of the balloon; and means supporting the axis of said body, permitting free but limited oscillatory movement thereof in altitude; whereby, wind pressure tending to turn the balloon from a predetermined direction of traverse, may be opposed by the gyroscopic effect of said rotary body, so that such wind pressure may be utilized to propel the balloon in directions oblique to the direction of the wind pressure.

3. In a balloon having its longitudinal axis substantially horizontal, the combination with levitating means; of a rotary body having its axis substantially horizontal; means supporting said axis, normally preventing azimuthal movement thereof while permitting free but limited altitudinal oscillatory movement thereof; whereby, wind pressure tending to turn the balloon from a predetermined direction of traverse, may be opposed by the gyroscopic effect of said rotary body, so that such wind pressure may be utilized to propel the balloon in directions oblique to the direction of the wind pressure.

4. In a balloon, the combination with levitating means; of a rotary body having its axis substantially horizontal; means supporting said axis, permitting free but limited oscillatory movement thereof in a direction parallel with said axis; and, means adjustable with respect to said axis, arranged to receive wind pressure in variable angular relation, whereby wind pressure tending to turn the balloon from a predetermined direction of traverse, may be opposed by the gyroscopic effect of said rotary body, so that such wind pressure may be utilized to propel the balloon in directions oblique to the direction of the wind pressure.

5. In a balloon, the combination with a rotary body; of electrical means to rotate said body at such speed as to produce a gyroscopic effect; and, means supporting said body, so that it has a freedom with respect to an axis eccentric to the axis of rotation of said body, substantially as set forth.

6. The combination with a rotary body; of means to rotate said body at such speed as to produce a gyroscopic effect; and, means supporting said body, so that it has a freedom with respect to a horizontal axis eccentric to the axis of rotation of said body, substantially as set forth.

7. The combination with a rotary body; of means to rotate said body at such speed as to produce a gyroscopic effect; and, means supporting said body, so that it has a freedom with respect to a horizontal axis eccentric to and above the axis of rotation of said body, substantially as set forth.

In testimony whereof, I have hereunto signed my name at Philadelphia, Pennsylvania, this 24th day of December 1907.

RUSSELL THAYER.

Witnesses:
  EDWIN J. MOLE,
  HIRAM BARNES.